United States Patent [19]

Oliver et al.

[11] Patent Number: 4,584,176
[45] Date of Patent: Apr. 22, 1986

[54] METHOD AND APPARATUS FOR STORING BICARBONATE DIALYSATE

[76] Inventors: James C. Oliver, 3989 Garfield Rd., Stone Mountain, Ga. 30083; Carl W. Oettinger, 747 Houston Mill Rd. NE., Atlanta, Ga. 30329

[21] Appl. No.: 591,280

[22] Filed: Mar. 19, 1984

[51] Int. Cl.$^4$ .............................................. F17C 5/00
[52] U.S. Cl. ......................................... 422/41; 137/1; 137/206
[58] Field of Search ................... 137/1, 206; 220/88 B; 422/10, 41, 42

[56] References Cited
U.S. PATENT DOCUMENTS 2,406,373  8/1946  Heigis ................................. 220/88 B
3,732,668  5/1973  Nichols ............................. 220/88 B Primary Examiner—Alan Cohan
Attorney, Agent, or Firm—William H. Needle

[57] ABSTRACT

The stability of bicarbonate dialysate is maintained over a prolonged period by maintaining a blanket of $CO_2$ at atmospheric pressure over the solution in an air-tight storage tank having a non-leaching interior. The $CO_2$ blanket is kept at atmospheric pressure in the storage tank by use of a negative pressure regulator connected to the $CO_2$ gas cylinder. $HCO_3$ in the stored dialysate remained stable for as long as thirty days.

1 Claim, 2 Drawing Figures

METHOD AND APPARATUS FOR STORING BICARBONATE DIALYSATE

BACKGROUND OF THE INVENTION

Recent scientific studies and reports have indicated a preference for bicarbonate hemodialysis over acetate dialysis. An article published in *asaio Journal*, Volume 6, July/September, 1983 by Antonia C. Novello and Carl M. Kjellstrand entitled "Is Bicarbonate Dialysis Better than Acetate Dialysis?" reviews the history of the two types of dialysis and concludes that there is considerable evidence that bicarbonate dialysis is preferable in terms of patient tolerance. This article stops short of recommending a full-scale switch from acetate to bicarbonate dialysis because of the great cost involved in doing so, and recommends further study of the problem.

Another article in Vol. XXVII *Trans Am Soc Artif Intern Organs*, 1981, pages 655 through 658, entitled "Panel Conference Acetate Versus Bicarbonate in Dialysis" includes the statement "Bosch notes that during acetate dialysis, a considerable number of patients have experienced a fall in blood pressure associated with such systems as weakness, nausea and vomiting. Hemodynamic studies have shown that during acetate dialysis the removal of fluid by ultrafiltration induces a fall in cardiac output. Total peripheral resistance does not change and consequently blood pressure falls. On the other hand, when quantitatively similar fluid removal during bicarbonate (dialysis) induces a comparable fall in cardiac output, peripheral resistance increases so blood pressure does not fall as much. Bicarbonate dialysis is thus tolerated better."

Other studies have similarly concluded that a return to bicarbonate dialysis as a preferred treatment is desirable if certain practical and economic problems can be satisfactorily solved. Not the least of these problems concerns the long term storage of bicarbonate dialysate. Presently, such solutions when used in dialysis systems must be disposed of at the end of each day. The instability of bicarbonate dialysate due to decomposition of $HCO_3$ into $CO_3$ and $CO_2$ which is lost into the atmosphere results in a decline in $HCO_3$ and increased dialysate pH. As a result, the stability of the solution can be maintained over a very brief storage period only.

The objective of the present invention is to deal directly with the problem of increasing the storage life of bicarbonate dialysate to such an extent that it will become feasible to use the medically preferred solution in kidney dialysis and to use it more economically than the less preferred acetate dialysate. In particular, the present invention seeks to increase the storage life of bicarbonate dialysate from one day to approximately thirty days. With this possibility realized through the present invention, the cost of using bicarbonate solutions for dialysis is reduced from $3.00–$4.00/gallon/treatment to $0.14/gallon/treatment. This renders the use of bicarbonate dialysate less costly than the use of acetate dialysate, in accordance with a further object of the invention.

SUMMARY OF THE INVENTION

In accordance with the present invention bicarbonate containing hemodialysate concentrate is blanketed with $CO_2$ gas in an air-tight vessel. The gas/liquid surface interface is maintained at absolute pressure through the use of a two stage pressure regulator having the ability to relieve positive pressure or vacuum. As bicarbonate dialysate is withdrawn from the storage tank, the resulting vacuum is relieved by the admission of $CO_2$ gas and positive pressure is vented out of the vessel to the ambient atmosphere to maintain an equal atmospheric pressure in the storage vessel.

Stability of the solution can be assured by measuring the solution pH. Decomposition will lead to a rise in pH above 8.0, or by excess $CO_2$ in the solution with a pH less than 7.4. A re-gassing tube extending from the top to the bottom of the storage vessel is used to increase $CO_2$ in the solution and reduce its pH if decomposition starts to occur.

A first variation of the process involves filling a collapsible container with liquefied bicarbonate dialysate and purging any dead air space with $CO_2$ prior to sealing the container to stabilize the solution. On use, the bag will collapse as the solution is removed. In this variation of the process, vacuum is not relieved; instead the vessel space collapses and maintains the anerobic environment.

In a second variation of the process, single use liquefied bicarbonate dialysate can be packaged accompanied by purging of the vessel with $CO_2$ and sealing the vessel anerobically. The seal is broken at use and the packaged solution must be used within eight hours.

DETAILED DESCRIPTION

Figure 1:
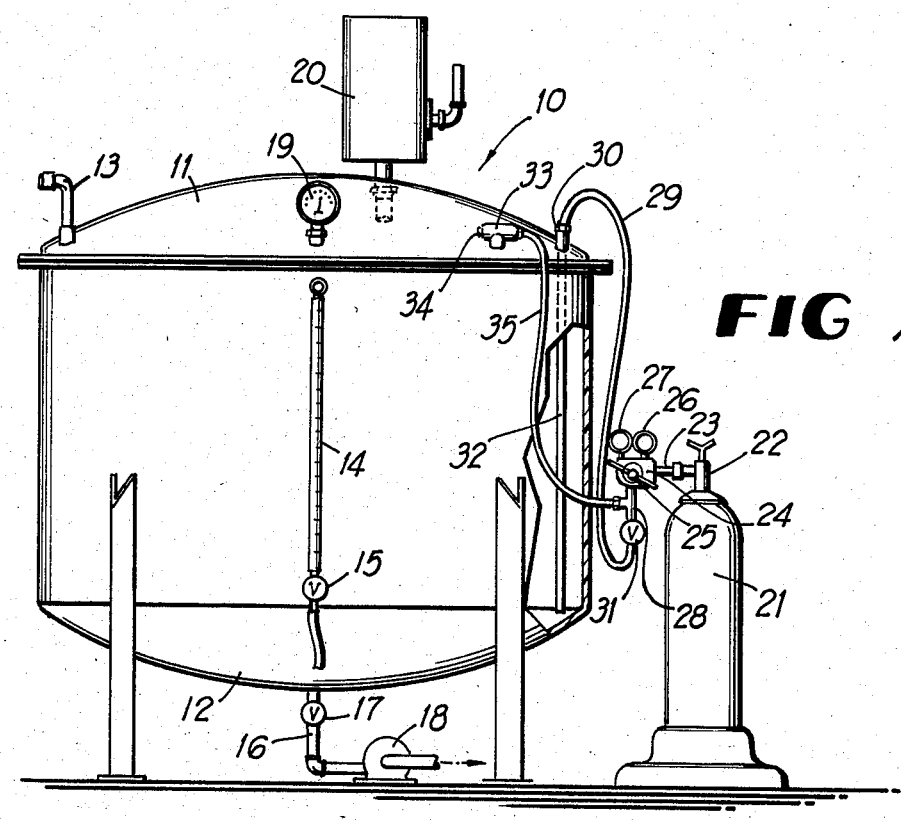
FIG. 1 is a side elevation of a storage vessel for liquefied bicarbonate dialysate and associated apparatus components used in the practice of a storage method according to the invention.
Figure 2:
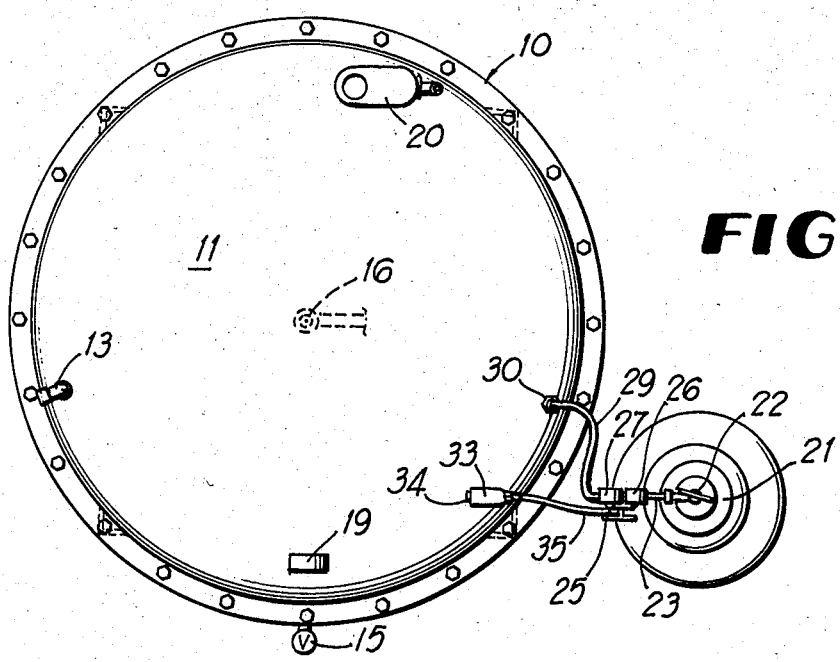
FIG. 2 is a plan view of the vessel and components.

Referring to the drawings in detail, wherein like numerals designate like parts, the apparatus according to the invention employed in the practice of the method comprises a storage vessel 10 of a sufficient size to hold 1000 gallons of bicarbonate solution used in kidney dialysis. The storage vessel 10 must have a non-leaching interior and may be formed of fiberglass with "AT-LAC" food grade resin, stainless steel, glass or polypropylene. To assure an air-tight vessel, all inlets and outlets must be sealable using ball valves, gaskets, one-way check valves or the like. The vessel may be cylindrical on a vertical axis, as illustrated, and mounted on suitable support legs. It may have a domed cover 11 and a similarly rounded bottom 12 although its shape is not critical.

The storage vessel 10 has a top filling tube 13 through which bicarbonate dialysate mixed by state-of-the-art techniques is introduced into the vessel. In some instances, the storage vessel may be used for mixing. The vessel 10 also has a liquid level indicating sight glass 14 on the exterior thereof and an on-off valve 15 for dispensing of the dialysate into bottles.

Alternatively, a pipe 16 descending from the bottom of the vessel 10 at its center and having another on-off valve 17 delivers the dialysate through an external pump 18 to a remote dialysis unit. The vessel is also equipped with a suitable pressure gage 19, such as a bellows-type gage, of stainless steel or bronze having a range compatible with the maximum safety relief range of the vessel.

The storage vessel 10 is further equipped with an automatic emergency safety pressure relief device 20 which vents to the ambient atmosphere in situations where the vent on the pressure regulator (yet to be described) is unable to vent fast enough during filling of the vessel, or if a malfunction occurs.

The apparatus further comprises a conventional $CO_2$ tank 21 mounted externally of the vessel 10 and having a manual on-off valve 22 connected by a pipe 23 to a first stage pressure regulator 24 having a main shut-off valve 25.

A first gage 26 on the regulator 24 indicates pressure in the $CO_2$ tank 21 and a separate gage 27 on the regulator 24 indicates the pressure of outgoing $CO_2$ gas from the regulator 24 through a T-fitting 28.

A hose 29 connected between the vertical branch of the T-fitting 28 and a fitting 30 in the vessel cover 11 is equipped with an on-off valve 31. The fitting 30 is connected to a vertical re-gassing tube 32 in the storage vessel 10 near the side wall thereof extending from its top substantially to its bottom through which $CO_2$ gas may percolate into the solution at proper times to increase $CO_2$ in the solution and decrease the solution pH if decomposition is starting to occur.

A second stage pressure regulator 33 forming an important apparatus component of the invention is connected in the storage vessel and includes a manually operated pressure vent 34. The second stage regulator 33 is connected by a hose 35 with the other branch of the T-fitting 28 connected with the outlet of first stage regulator 24.

The process for relatively long term storage of bicarbonate dialysate without loss of stability caused by decomposition of $HCO_3$ and increased dialysate pH is as follows.

Bicarbonate dialysate is mixed according to state-of-the-art techniques. 66 grams $NaHCO_3$ per liter of solution is added, and 23 grams NaCl per liter is added.

The storage vessel 10 is purged of atmospheric air by displacement with $CO_2$ gas for three to five minutes. Bicarbonate dialysate (1000 gallons) is transferred into the storage vessel through filling tube 13 with a pump. The bicarbonate dialysate is filtered to a tolerance of approximately 5 microns.

$CO_2$ displaced by filling the storage vessel with dialysate is vented to the atmosphere through the regulator 33. Once the solution is transferred into the storage vessel 10, all entry points to the vessel are sealed. Vessel environment is stabilized if necessary, to attain 0 mmHg of pressure/vacuum.

Laboratory analysis of the solution is verified by assaying the solution for Na, Cl, $HCO_3$, pH, $pCO_2$, and $TCO_2$.

The $CO_2$ tank regulator 24 is set to maintain pressure to the second stage regulator 33 in the range of 50–200 psi gage.

Dialysate solution is removed from the vessel 10 on demand, either manually through the valve 15, or automatically through the valve 17 and pump 18, for delivery to a kidney dialysis machine. Removal of the solution creates a slight vacuum in the vessel 10. The degree of vacuum is proportional to the volume of solution removed from the vessel 10. This vacuum is relieved automatically by influx of $CO_2$ gas through the second stage regulator 33. The flow of $CO_2$ gas into the vessel 10 continues until the vessel environment reaches 0 mmHg, and then stops automatically.

Failure of the second stage 33 to operate correctly leads to a pressure/vacuum increase in the vessel 10. Correction of failure to relieve the vacuum automatically is performed manually by the introduction of $CO_2$ gas and/or by the action of the safety relief vent 20, set at 8 oz. psi and 4 oz. psi vacuum. If pressure/vacuum is not relieved, the vent 20 will automatically relieve at its respective safety settings.

Chemical Principles:

Usually bicarbonate solutions upon standing, agitation, or heating decompose in the following manner:

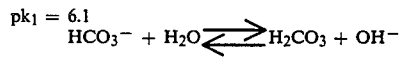

$$pk_1 = 6.1$$
$$HCO_3^- + H_2O \rightleftharpoons H_2CO_3 + OH^-$$

or,

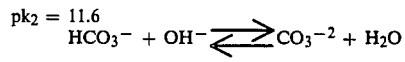

$$pk_2 = 11.6$$
$$HCO_3^- + OH^- \rightleftharpoons CO_3^{-2} + H_2O$$

Both reactions are reversible by adding $CO_2$ to prevent effervescence and maintain pH. This addition of $CO_2$ is through the re-gassing tube 32.

The cost of bicarbonate dialysis per treatment using dialysate stored in accordance with the invention for a term of three weeks or more is $0.92, compared to $2.95 for commercially available acetate dialysis and $7.00 per treatment with commercially available bicarbonate dialysis. On this basis, it should be apparent that the long-term storage method maintaining the stability of bicarbonate dialysate renders it the solution of choice in any sizable dialysis unit.

It is to be understood that the form of the invention herewith shown and described is to be taken as a preferred example of the same, and that various changes in the shape, size and arrangement of parts may be resorted to, without departing from the spirit of the invention or scope of the subjoined claim.

We claim:

1. A method of storing liquefied bicarbonate dialysate comprising the steps of placing a quantity of liquefied bicarbonate dialysate in a hermetically sealed storage vessel, blanketing the liquefied bicarbonate dialysate with $CO_2$ gas in the storage vessel, and maintaining a substantially constant atmospheric pressure in the storage vessel at the gas/liquid surface interface throughout a relatively long term storage interval and the preliminary steps of purging the storage vessel of air by displacing the air with $CO_2$ gas for several minutes, and transferring liquefied bicarbonate dialysate into the purged storage vessel and then sealing all entry points to the storage vessel.

* * * * *